United States Patent
Hay

[15] 3,673,219
[45] June 27, 1972

[54] 4-PHENYL 2-(2'-HYDROXY-META-TERPHENYL-5'-YL)-DIBENZOFURAN AND 4,4'-DIPHENYL-2,2'-BIDIBENZOFURAN

[72] Inventor: Allan S. Hay, Schenectady, N.Y.
[73] Assignee: General Electric Company
[22] Filed: June 23, 1970
[21] Appl. No.: 49,196

[52] U.S. Cl. .................... 260/346.2 M, 260/619 R, 260/75, 260/77.5, 204/1, 252/301.3
[51] Int. Cl. ............................................................. C07d 5/44
[58] Field of Search ........................................ 260/346.2 M

[56] References Cited

UNITED STATES PATENTS 3,306,875    2/1967    Hay ....................................... 260/619

Primary Examiner—Alex Mazel
Assistant Examiner—Bernard Dentz
Attorney—James W. Underwood, Richard R. Brainard, Paul A. Frank, Joseph T. Cohen, Frank L. Neuhauser, Oscar B. Waddell and Joseph B. Forman

[57] ABSTRACT

Heating 3,3',5,5'-tetraphenyldiphenoquinone above its melting point but below its carbonization temperature causes an intramolecular disproportionation reaction the progress of which is monitored by the color change. Three sexiphenyl compounds are produced which are separable by chromatography. Two of the products are new compounds, having one and two dibenzofuran groups, respectively in their structures. The bidibenzofuran compound can be converted to 5',5''-diphenyl-m-quaterphenyl-2,2'''-diol, useful in the preparation of polycarbonates and polyester. The other two products can be reworked to serve as a recycle feedstock.

5 Claims, No Drawings

4-PHENYL 2-(2'-HYDROXY-META-TERPHENYL-5'-YL)-DIBENZOFURAN AND 4,4'-DIPHENYL-2,2'-BIDIBENZOFURAN

This invention relates to novel sexiphenyl compounds and to a process for producing the same. More specifically, this invention relates to the conversion of 3,3',5,5'-tetraphenyl-diphenoquinone, compound I, to the sexiphenyl compounds II, III and IV according to the following equation:

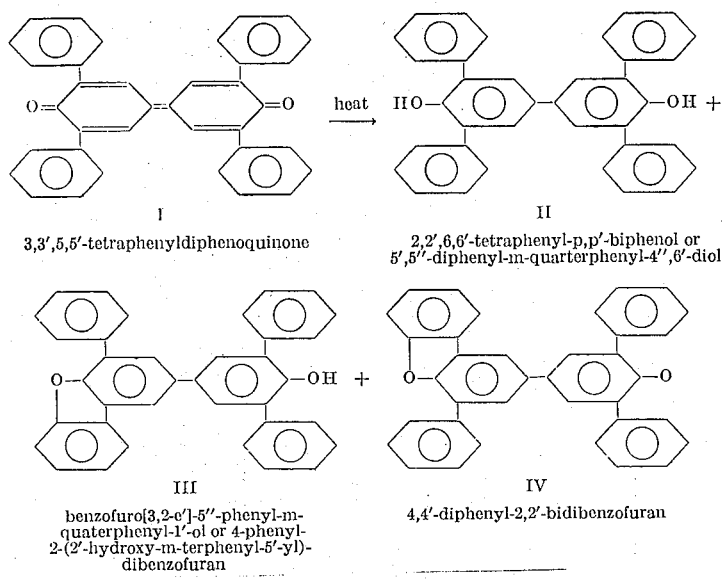

I
3,3',5,5'-tetraphenyldiphenoquinone

II
2,2',6,6'-tetraphenyl-p,p'-biphenol or
5',5''-diphenyl-m-quaterphenyl-4'',6'-diol III
benzofuro[3,2-e']-5''-phenyl-m-quaterphenyl-1'-ol or 4-phenyl-2-(2'-hydroxy-m-terphenyl-5'-yl)-dibenzofuran IV
4,4'-diphenyl-2,2'-bidibenzofuran My copending application Ser. No. 209,351, filed Dec. 17, 1971, as a division of this application relates to the ring opening of the two furan rings in compound IV to produce 5',5''-diphenyl-m-quater-phenyl-2,2'''-diol and also claims it as a compound.

The art on compounds having six phenyl groups in the molecule is extremely sparse. Compound I and a method of making it are disclosed in my U.S. Pat. Nos. 3,210,384, 3,306,874 and 3,306,875. Compound II is disclosed and claimed as a new chemical compound in my copending application, Ser. No. 556,575, filed June 10, 1966, now U.S. Pat. No. 3,631,208 and assigned to the same assignee as the present invention. These patents are discussed in more detail later. Bidibenzofuran and a few of its alkyl substituted derivatives are known and have very strong scintillating properties. The present invention provides an extremely simple process to produce several sexiphenyl compounds which would be difficult if not impossible to produce by prior art means.

The starting diphenoquinone I has a melting point of approximately 290° C. The reaction to form the above three products, II, III and IV proceeds quite rapidly, i.e., about 30 minutes at 300° C. and is easily monitored since the initial dark red melt of the diphenoquinone fades as the reaction proceeds and becomes light amber or yellow when the reaction is essentially complete. Higher temperatures, up to the carbonization temperature of the mixtures, i.e., the temperature at which the starting materials or products decompose to carbon, can be used to speed the reaction. No catalyst is necessary and the reaction does not need to be carried out in an inert atmosphere but can be if desired.

It will be noted that compound II is the reduced form of the starting material. In one run, air was intentionally bubbled through the melt during the reaction in the hopes that this product could be reoxidized back to the starting material to increase the yield of compound IV. However, in the absence of a catalyst or stronger oxidizing system, no beneficial results were noted. As is illustrated later, compound II has been oxidized back to the starting diphenoquinone as a separate reaction to ultimately increase the yield of compound IV.

Inspection of the equation will show that this thermolytic reaction involves intramolecular hydrogenation and dehydrogenation to occur in which the quinoid oxygen of the diphenoquinone is converted either to a hydroxyl group or has formed a furan ring by bridging to the ortho position of one of the two adjacent phenyl substituents, with simultaneous aromatization of the quinoid rings.

When compound IV is reacted with an alkali metal, for example lithium, sodium potassium, rubidium or cesium, preferably sodium, the two furan rings are opened with one atom of alkali-metal adding to the oxygen and one atom adding to the ring at the position where the oxygen atom was previously attached producing a high yield of the metallated form of the dialkali metal salt of 5',5''-diphenyl-m-quaterphenyl-2,2'''-diol. In the presence of a reactive ether solvent, the metal atoms on the ring are removed to produce the dialkali metal salt which is readily converted to the free phenol by treatment with an acid. Apparently the opening of the furan rings of this compound occurs essentially in only one of the two possible ways so a mixture of products is not obtained. The overall net result of this reaction is shown in the following equation:

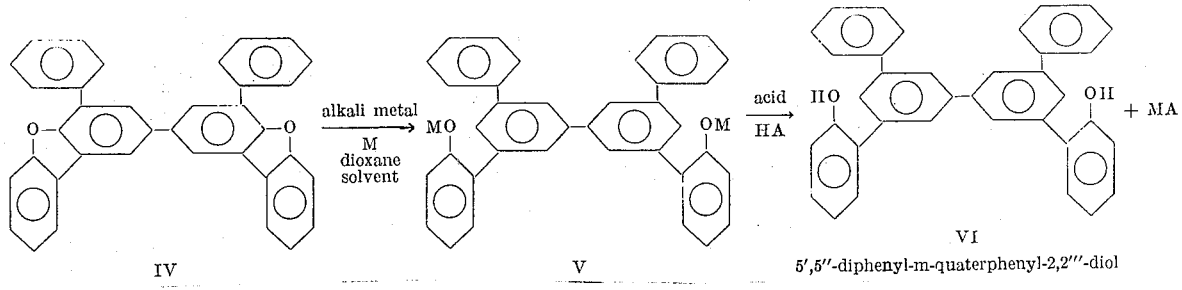

IV

V

VI
5',5''-diphenyl-m-quaterphenyl-2,2'''-diol

Although the cleavage reaction of ethers generally requires the alkali metal adduct of an arene having at least two connected or fused aromatic rings, only the alkali metal is required when the ether itself has two connected or fused aromatic rings. It will be recognized that compound IV has two cyclic ether groups and the required two connected aromatic rings and therefore the alkali metal adduct can be prepared in situ from an alkali metal and the compound to be cleaved. The preparation of the alkali metal adduct of arenes and the cleavage reaction using an alkali metal adduct to cleave poly(phenylene oxides), also known as polyphenylene ethers, is more fully described in my U.S. Pat. No. 3,442,858, which is hereby incorporated by reference for the general details of the cleavage agents and reaction conditions which I have found are equally applicable to the cleavage reaction of this application. The use of an alkali metal alone to cleave an ether with two connected aromatic rings is more fully described and discussed in column 3, lines 3 – 25 of this patent. Although the alkali metal adduct of another arene other than compound IV could be made and used as is also described in this patent, this would introduce another aromatic compound into the reaction mixture which would require separation. Therefore, for simplification, I prefer to react the alkali metal directly with compound IV using the technique for making the adducts as described in my above-referenced patent.

Although the other ether solvents or hydrocarbon solvents used in conjunction with amines can be used in conjunction with the alkali metals for the cleavage of the subject bidibenzofuran, I prefer to use tetrahydrofuran or dioxane, preferably dioxane as the solvent for this cleavage reaction and to carry out the reaction at the reflux temperature of the reaction mixture. Under these conditions, the yield of desired products is optimized. Any cleavage products of dioxane, which are formed in the metallation reaction, are easily removed from the desired diol product of this invention by evaporation, distillation or recrystallization techniques.

Compound II is disclosed and claimed as a new chemical compound in my copending application Ser. No. 556,575, filed June 10, 1966, now U.S. Pat. No. 3,631,208 and assigned to the same assignee as the present invention. The patent also discloses and claims a method of making this compound by reaction of the diphenoquinone compound I with 2,6-diphenylphenol. In this reaction, the diphenoquinone is reduced to compound II and the phenol is oxidatively coupled to form compound II. Compound II, being a dihydric phenol is capable of producing polyesters and polycarbonates but because of the two phenyl substituents on each side of the hydroxyl group, the reaction involving the hydroxyl groups in the formation of the polyesters or polycarbonates is greatly hindered and does not proceed as readily as it would if the phenyl groups were not hindering the hydroxyl group. Furthermore, because of the symmetrical nature of the biphenol, the polyesters and polycarbonates generally are less soluble and the resulting polymers much higher melting than when the biphenol used is not symmetrical.

I have found that the usual oxidizing agents used in oxidizing hydroquinones to quinones and biphenols to diphenoquinones are capable of oxidizing compound II back to compound I. Typical of such oxidizing agents are silver peroxide nickel peroxide, manganese dioxide, organic peroxides, chromic acid, etc. A preferred way is to use an oxidation catalyst permitting air or other oxygen containing gas to be used as the oxidizing agent. Typical useful catalysts for such a reaction are the basic cupric complex catalysts disclosed in my U.S. Pat. Nos. 3,210,384; 3,306,874; 3,306,875 and the Blanchard et al. patents 3,219,625; 3,219,626; 3,259,629 and 3,277,095, all of which are hereby incorporated by reference. These patents teach the oxidation of 2,6-disubstituted phenols to the corresponding tetrasubstituted diphenoquinones. I have found that the same reaction conditions and catalysts disclosed in these patents are equally applicable to the oxidation of compound II back to compound I. The diphenoquinones are very insoluble compounds and readily precipitate from the reaction mixture permitting their easy removal and recycling back as the starting material in the process disclosed herein.

The three products, II, III and IV are readily separated from each other by chromatography. The order of retention on a chromatographic substrate is IV < III < II. Compound IV is much more readily separated in highly purified form from compounds II and III than are the latter two compounds from each other. A preferred means to separate compound II from compound III, after compound IV has been separated by chromatography, is to oxidize the mixture of II and III thereby converting compound II to compound I, as described above, which precipitates from the reaction mixture because of its insolubility in the solvents generally used for this reaction. In this oxidation reaction, compound III is oxidized to its stable free phenoxy radical. Treatment with a reducing agent, for example hydrazine, hypophosphorus acid, etc. converts the free radical back to the compound III. It can then be isolated from solution by ordinary techniques.

Compound III, if desired, can be reacted with an alkali metal to convert the cyclic ether group to a phenolic group as described above for compound IV. However, such a biphenol would have one very hindered and one unhindered hydroxyl group which could cause complications because of the difference in reactivity if the biphenol was used for making polyesters or polycarbonates. However, where a biphenol is desired having one easily reactable and one difficultly reactable hydroxyl group, such a biphenol would be the desired compound. Compound III can be mixed with compound I in recycle reactions to produce additional amounts of compound IV. All three of the compounds, II, III and IV scintillate when exposed to ionizing radiation. They therefore can be used in making scintillation counters for detecting and registering ionizing irradiation.

In order that those skilled in the art may better understand my invention, the following examples are given by way of illustration and not by way of limitation. Where elemental analysis are given, the values calculated for the stated compound are given in parentheses immediately following the determined values.

EXAMPLE 1

This example shows the preparation of 3,3′,5,5′-tetraphenyldiphenoquinone from 2,6-diphenylphenol. Oxygen was passed for 5 hours through a vigorously stirred solution of 50 g. of 2,6-diphenylphenol and 4.0 g. of cuprous chloride in 500 ml. of n-butyronitrile heated to 100° C. On cooling, the reaction mixture and filtering, there was obtained 42 g. of 3,3′,5,5′-tetraphenyldiphenoquinone melting at 290° C. (dec.). A small portion of this diphenoquinone was dissolved in hot acetic acid and reduced with hydrazine to the corresponding biphenol which is identical with compound II. It has a melting point of 196° C. and has an elemental analysis C, 88.30 (88.13), H, 5.28 (5.34).

EXAMPLE 2

A portion of the above diphenoquinone weighing 9.80 g. was placed in a test tube and heated to 300° C. for 0.5 hours. The initial dark red melt had become light amber in color by this time. The reaction mixture was cooled and dissolved in two volumes of benzene. Previous work had shown that a xylene solution of the mixture of these three compounds could be readily separated into their three components by thin layer chromatography using silica gel plates and compounds IV, III AND II had $R_f$ values of 1, 0.7 and 0.5, respectively. Since compound IV has a $R_f$ value of 1, this means that compound IV is not absorbed on the chromatographic substrate from the solvent and will remain in solution and be discharged from the column with the solvent.

The solution of the reaction mixture was chromatographed over activated alumina (column 2 inches in diameter by 12 inches long) using benzene as eluant. The first fractions obtained from the column were monitored by thin layer chromatography and found to contain only compound IV. Combination of these fractions and evaporation of the benzene yielded 2.56 g. of product having a melting point of 231°–4° C.

and whose elemental analysis agreed with the theoretical analysis for compound IV; C, 88.7 (88.86); H, 4.7 (4.56); molecular weight, 495 (486).

Compounds II and III remaining on the chromatography column, were eluted with ethanol-benzene mixture and the solvent evaporated. The residue was dissolved in 150 ml. of ethanol to which was added 0.5 g. of cuprous chloride and 2 ml. of N,N,N',N'-tetramethylethylenediamine. Oxygen was passed through the vigorously stirred solution for 0.5 hours without application of heat producing a green solid precipitate which was removed by filtration. Treatment with 250 ml. of hot chloroform dissolved all but the insoluble copper salts which were removed by filtration. The solvent was evaporated from the filtrate yielding 5.63 g. of the starting 3,3',5,5'-tetraphenyldiphenoquinone which resulted from the oxidation of compound II in the oxidation reaction. The intense red colored filtrate from the oxidation reaction was treated with sufficient hypophosphorus acid to discharge the red color of the reaction mixture, which was then flooded with water to produce a solid precipitate. After removal by filtration, the solid was recrystallized from acetic acid to yield 1.24 g. of compound III having a melting point of 196°–8° C., whose elemental analysis agreed with that for compound III; C, 88.6 (88.50); H, 5.17 (4.95).

Further evidence that the reaction has produced the above three compounds was obtained when it was found that superposition of the infrared spectra (in $CS_2$) of compounds II and IV, gives a spectrum that is essentially identical with that of compound III. Furthermore, the molar extinction coefficients of all of the major bands of compound III are approximately one-half of the corresponding bands in compounds II or IV.

EXAMPLE 3

This example shows the conversion of compound IV to compound VI. A mixture of 104 g. of compound IV, 1.5 liters of purified dioxane and 30 g. of sodium was refluxed for 16 hours. The excess sodium was destroyed by treatment with methanol after which the reaction mixture was diluted with water producing a colorless solid precipitate of compound V. After two recrystallizations from acetic acid, there was obtained 91 g. of 5',5''-diphenyl-m-quaterphenyl-2,2'''-diol, compound VI, as white crystals having a melting point of 184°–5 C. and an elemental analysis of C, 87.7 (88.13); H, 5.40 (5.34).

The above examples have shown some of the variations which are possible with my invention. Other obvious variations will be apparent to those skilled in the art. For example, a complete summation of the reactions shown in the above examples illustrates how 2,6-diphenylphenol can be converted to compound VI and also how compound II can be converted to compound VI. In these reactions, the hydroxyl group has been transferred from one phenyl group to an adjacent phenyl group which was the ortho substituent on the phenyl nucleus originally having the hydroxyl group. By this series of reactions the hindered biphenol II has been converted to an unhindered biphenol VI which makes it much more useful in the making of polycarbonates and polyester resins or mixed polyester-polycarbonate resins. Furthermore because of the non-symmetry of the structure, the polymers are more readily soluble and less intractable. All such obvious variations are within the scope of the invention as defined by the appended claims.

What I claim as new and desire to secure by Letters Patent of the United States is:

1. The chemical compounds having the formulas

A 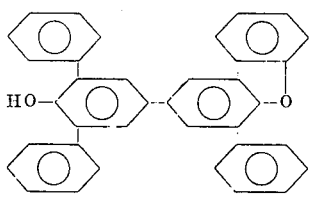

B 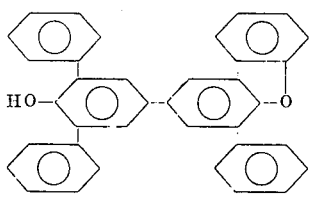

2. The compound of claim 1 having formula A.
3. The compound of claim 1 having formula B.
4. The process of producing compounds A and B of claim 1 which comprises heating 3,3',5,5'-tetraphenyldiphenoquinone to at least its melting point but below its carbonization temperature for a time sufficient to discharge essentially all of the initial red color and separating compound A and B from the reaction mixture.
5. The process of producing compound A and B of claim 1 which comprises heating 3,3',5,5'-tetraphenyldiphenoquinone to at least its melting point but below its carbonization temperature for a time sufficient to discharge essentially all of the initial red color, separating compound A from the reaction mixture, thereafter oxidizing the balance of the reaction mixture to convert the 2,2',6,6'-tetraphenyl-p,p'-biphenol to the starting diphenoquinone, and compound B to its stable free radical, separating the free radical from the diphenoquinone and thereafter reducing the free radical to compound B.

* * * * *

UNITED STATES PATENT OFFICE
CERTIFICATE OF CORRECTION

Patent No. 3,673,219  Dated June 27, 1972

Inventor(s) Allan S. Hay

It is certified that error appears in the above-identified patent and that said Letters Patent are hereby corrected as shown below:

Column 1, line 9, formula IV should appear as follows:

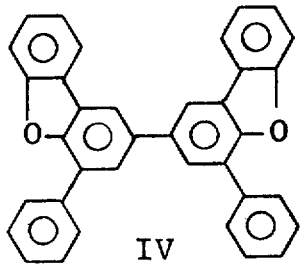

4,4'-diphenyl-2,2'-bidi-
benzofuran

Column 4, line 64 for "AND" read - and -. Claim 1, lines 2 and 3, the formulae of compounds A and B should appear as follows:

A 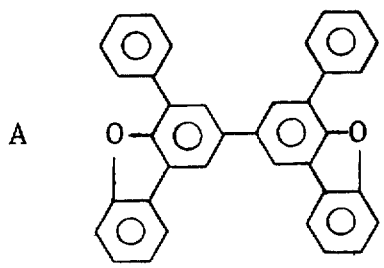

B 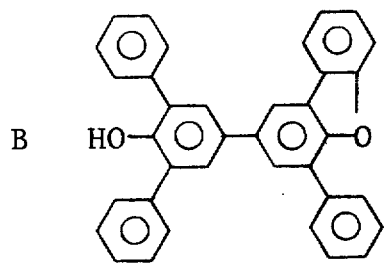

Signed and sealed this 6th day of March 1973.

(SEAL)
Attest:

EDWARD M. FLETCHER, JR.          ROBERT GOTTSCHALK
Attesting Officer                 Commissioner of Patents